Patented Dec. 16, 1941

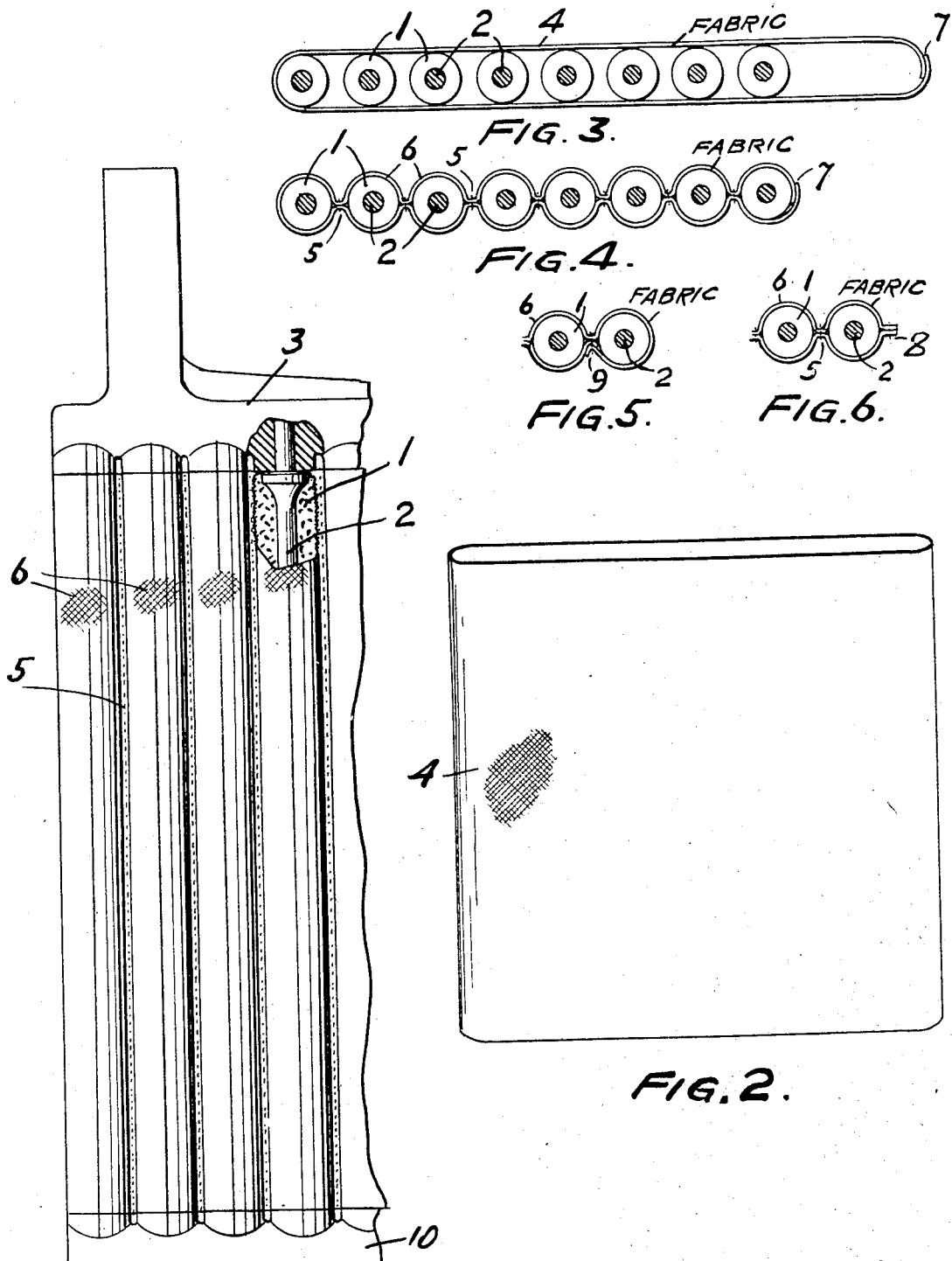
Dec. 16, 1941. C. D. GALLOWAY 2,266,546
STORAGE BATTERY PLATE AND METHOD OF MAKING THE SAME
Filed July 20, 1940
INVENTOR
Charles D. Galloway
BY
Augustus B. Stoughton
ATTORNEY.

2,266,546

UNITED STATES PATENT OFFICE 2,266,546

STORAGE BATTERY PLATE AND METHOD OF MAKING THE SAME

Charles D. Galloway, Wyndmoor, Pa., assignor to The Electric Storage Battery Company, Philadelphia, Pa., a corporation of New Jersey Application July 20, 1940, Serial No. 346,459

3 Claims. (Cl. 136—55)

The invention relates to storage battery plates or electrodes of the tubular type which, generally stated, consists of pencils of active material mounted on spines connected with top and bottom bars and covered with an individual retainer usually in the form of a tube. One usual way of making such plates or electrodes is to assemble the spines and pencils and individual tubular retainers and to apply the top and bottom bars to the assemblages. This procedure is expensive and consumes considerable time and labor.

The principal object of the present invention is to effect not only a material saving in the method of assembly but also an improvement in the finished plate or electrode.

Other objects of the invention will appear from the following description at the end of which the invention will be claimed.

Generally stated, the invention comprises a hoop or band of acid resistant fabric surrounding a row of pencils of active material mounted on spines connected with a top bar and seamed between the individual pencils forming connected sheaths, each of said sheaths enclosing an individual pencil, and the invention further comprises the method of making such plates or electrodes which consists in molding individual pencils of active material on the respective spines projecting in a row from a bar, surrounding the group of pencils with a hoop or band of acid resisting fabric larger in girth than the girth of the group, and progressively uniting or seaming the faces of the hoop between the pencils, thereby enclosing each pencil in an individual sheath.

The invention also comprises the improvements to be presently described and finally claimed.

Referring to the drawing,

Figure 1 is an elevational view of a part of a plate or electrode with portions broken away embodying features of the invention.

Figure 2 is a perspective view of band or hoop useful in the practice of the invention.

Figure 3 is a top plan view partly in section illustrative of a step in the method of the invention.

Figure 4 is a horizontal section illustrating an electrode of the invention.

Figs. 5 and 6 are similar views illustrating modifications.

Referring to the drawing, the plates consist of pencils 1 of active material or material adapted to become active. These pencils are mounted on spines 2 of conducting material. 3 is a bar with which the spines 2 arranged in a row are preferably made integral. 4 is a hoop, band or sleeve of acid resisting fabric and it surrounds the row of pencils. The band is seamed or united between the individual pencils, as at 5, forming connected sheaths 6 and each sheath encloses an individual pencil.

The band or hoop 4 may be fabricated as a unit as in Fig. 2 or it may be made in the form of a strip as in Fig. 3 and in that case the ends are shown as lapped and connected at 7. As shown in Fig. 6 the ends are brought together and secured to each other as at 8. As shown in Fig. 5 the ends are lapped between pencils and secured to each other as at 9.

The described plate or electrode according to the present invention is manufactured by molding or pasting individual pencils 1 onto the spines 2. Since the bar 3 and spines are made in one piece a group of pencils 1 may be individually molded or pasted on the spines at one operation. The band or sleeve 4 is then applied to the pencils and it is stitched or otherwise fastened between the respective pencils providing a sheath 6 for each pencil. The stitching or fastening may be accomplished by a sewing machine using thread, for example, of the same material as the sheath. At the ends of each sheath it is contracted toward the spine thus closing the envelope. It will, of course, be understood that the sheath is sufficiently longer than the spines to provide material for this purpose. A bottom bar 10 is then applied to the ends of the spines with the adjacent ends of the sheaths contracted as described. The top bar and spines are of conductive material such as lead alloy and the bottom bar may be of similar alloy or of any appropriate acid resisting material.

It will be obvious that modifications may be made in details of construction and arrangement without departing from the spirit of the invention which is not limited to such matters or to matters of mere form.

I claim:

1. In a storage battery plate or electrode comprising a bar and a group of separate pencils of active material mounted on spines connected with the bar and arranged in a row, the improvement which consists in a hoop of acid resisting flexible and stretchable and porous textile fabric surrounding the row of pencils and united between the individual pencils forming connected sheaths, each of said sheaths enclosing an individual pencil.

2. In the manufacture of storage batteries of the type recited the improvement which consists in molding individual pencils of active material on the respective spines projecting in a row from a bar, surrounding the group of pencils with a hoop of acid resisting fabric larger in girth than the group, and progressively uniting the faces of the hoop between the pencils thereby enclosing each pencil in an individual sheath.

3. A storage battery plate comprising a top bar and a bottom bar, a group of pencils of active material arranged in a row and having spines secured to said bars, and a hoop of acid resisting, flexible, stretchable, and porous textile fabric surrounding said row of pencils and stitched between the individual pencils to form connected sheaths, each of which encloses an individual pencil.

CHARLES D. GALLOWAY.